(12) United States Patent
Haque et al.

(10) Patent No.: US 7,138,023 B2
(45) Date of Patent: Nov. 21, 2006

(54) DEVELOPMENT OF THERMOPLASTIC COMPOSITES USING WET USE CHOPPED STRAND (WUCS)

(75) Inventors: Enamul Haque, Novi, MI (US); Michael Jander, Eupen (BE)

(73) Assignees: Owens-Corning Fiberglas Technology, Inc., Summit, IL (US); Owens Corning Composites S.P.R.L., Brussels (BE)

( * ) Notice: Subject to any disclaimer, the term of this patent is extended or adjusted under 35 U.S.C. 154(b) by 480 days.

(21) Appl. No.: 10/688,013

(22) Filed: Oct. 17, 2003

(65) Prior Publication Data

US 2005/0082721 A1    Apr. 21, 2005

(51) Int. Cl.
*B32B 37/00*    (2006.01)

(52) U.S. Cl. ............... 156/148; 156/62.2; 156/181; 156/296

(58) Field of Classification Search ............... 156/166, 156/180, 181, 256, 62.2, 296, 148
See application file for complete search history.

(56) References Cited

U.S. PATENT DOCUMENTS

| | | | |
|---|---|---|---|
| 3,498,770 A * | 3/1970 | Philipps et al. ............... 65/529 |
| 4,240,994 A | 12/1980 | Ottenholm |
| 4,394,414 A | 7/1983 | Brown et al. |
| 4,461,804 A | 7/1984 | Motsinger et al. |
| 4,840,755 A * | 6/1989 | Nakazawa et al. .......... 264/143 |
| 4,948,661 A | 8/1990 | Smith et al. |
| 5,804,313 A | 9/1998 | Schell |
| 5,976,295 A | 11/1999 | Ang |
| 6,054,022 A | 4/2000 | Helwig et al. |
| 6,148,641 A * | 11/2000 | Blough et al. ............... 65/529 |
| 6,268,047 B1 | 7/2001 | Mulder et al. |
| 6,291,552 B1 * | 9/2001 | Dong ......................... 523/217 |
| 6,365,090 B1 * | 4/2002 | Strait et al. ................. 264/143 |
| 6,497,787 B1 | 12/2002 | Geel |
| 2003/0000663 A1 | 1/2003 | Geel |

FOREIGN PATENT DOCUMENTS

| | | |
|---|---|---|
| EP | 0 148 760 | 7/1985 |
| GB | 1 424 682 | 2/1976 |
| WO | WO 02/060702 | 8/2002 |

OTHER PUBLICATIONS

Enquireply archives, May 1999, Week 5 (#269), p. 1 of 1; peach.ease.lsoft.com; The Electronic Commerce Korea (EC Korea) Harmonized Code: 70-7020 Glass & Glassware.

* cited by examiner

*Primary Examiner*—Jeff H. Aftergut
(74) *Attorney, Agent, or Firm*—Inger H. Eckert; Margaret S. Millikin (57) ABSTRACT

A process for forming thermoplastic composites that uses wet use chopped strand glass is provided. Wet reinforcement fibers such as wet chopped strand glass fibers are opened by passing the fibers consecutively through a first opener, a condenser, and, optionally, a second opener. The opened reinforcement fibers are mixed with a resin and transferred to a first sheet former. The resin is preferably polypropylene fibers. An optional second sheet former may be used to form a final composite having high structural integrity. The resulting sheet may be optionally passed through a needle felting machine for mechanical strengthening. The sheet is then passed through a thermal bonder to thermally bond the reinforcement glass fibers and resin. The composite product that exits the thermal bonder can be subsequently used as a reinforcement in a molding process to produce composite articles.

14 Claims, 4 Drawing Sheets

DEVELOPMENT OF THERMOPLASTIC COMPOSITES USING WET USE CHOPPED STRAND (WUCS)

TECHNICAL FIELD AND INDUSTRIAL APPLICABILITY OF THE INVENTION

The present invention relates generally to a process for producing thermoplastic composites and more particularly to a dry-laid process for forming thermoplastic composites that uses wet use chopped strand glass fibers.

BACKGROUND OF THE INVENTION

Typically, glass fibers are formed by drawing molten glass into filaments through a bushing or orifice plate and applying a sizing composition containing lubricants, coupling agents, and film-forming binder resins to the filaments. The aqueous sizing composition provides protection to the fibers from interfilament abrasion and promotes compatibility between the glass fibers and any matrix in which the glass fibers are to be used for reinforcement purposes. After the sizing composition is applied, the fibers may be gathered into one or more strands and wound into a package or, alternatively, the fibers may be chopped while wet and collected. The collected chopped strands can then be dried and cured to form dry use chopped strand glass (DUCS), or they can be packaged in their wet condition as wet use chopped strand glass (WUCS). Such chopped glass fiber strands are commonly used as reinforcement materials in thermoplastic articles. It is known in the art that glass fiber reinforced polymer composites possess higher mechanical properties compared to unreinforced polymers. Thus, better dimensional stability, tensile strength and modulus, flexural strength and modulus, impact resistance, and creep resistance can be achieved with glass fiber reinforced composites.

Fibrous mats, which are one form of fibrous non-woven reinforcements, are extremely suitable as reinforcements for many kinds of synthetic plastic composites. The two most common methods for producing glass fiber mats from chopped glass fibers are wet-laid processing and dry-laid processing. Generally, in a conventional wet-laid process, the chopped fibers are dispersed in a water slurry which may contain surfactants, viscosity modifiers, defoaming agents, or other chemical agents. Once the chopped glass fibers are introduced into the slurry, the slurry is agitated so that the fibers become dispersed. The slurry containing the fibers is then deposited onto a moving screen, and a substantial portion of the water is removed to form a web. A binder is then applied, and the resulting mat is dried to remove the remaining water and cure the binder. The formed non-woven mat is an assembly of dispersed, individual glass filaments. Wet-laid process are commonly used when a very uniform distribution of fibers is desired.

Conventional dry-laid processes include processes such as an air-laid process and a carding process. In a conventional air-laid process, dried chopped glass fibers are air blown onto a conveyor or screen and consolidated to form a mat. For example, dry chopped fibers and polymeric fibers are suspended in air, collected as a loose web on a screen or perforated drum, and then consolidated to form a randomly oriented mat. In a conventional carding process, a series of rotating drums covered with fine wires and teeth comb the glass fibers into parallel arrays to impart directional properties to the web. The precise configuration of the drums will depend on the mat weight and fiber orientation desired. The formed web may be parallel-laid, where a majority of the fibers are laid in the direction of the web travel, or they can be random-laid, where the fibers have no particular orientation.

Dry-laid processes are particularly suitable for the production of highly porous mats and are suitable where an open structure is desired in the resulting mat to allow the rapid penetration of various liquids or resins. However, such conventional dry-laid processes tend to produce mats that do not have a uniform weight distribution throughout their surface areas, especially when compared to mats formed by conventional wet-laid processes. In addition, the use of dry-chopped input fibers can be more expensive to process than the fibers used in a wet-laid process because the fibers in a dry-laid process are typically dried and packaged in separate steps before being chopped.

For certain reinforcement applications in the formation of composite parts, it is desirable to form fiber mats in which the mat includes an open, porous structure (as in a dry-laid process) and which has a uniform weight (as in a wet-laid process). Therefore, there exists a need in the art for a cost-effective and efficient process for forming a non-woven mat which has a substantially uniform weight distribution, and which has an open, porous structure that can be used in the production of reinforced composite parts that overcomes the disadvantages of conventional wet-laid and dry-laid processes.

SUMMARY OF THE INVENTION

An object of the invention is to provide a dry-laid process for forming thermoplastic composites that uses wet reinforcement fibers. In a preferred embodiment, the wet reinforcement fibers are wet use chopped strand glass fibers. Typically, the wet reinforcement fibers are agglomerated in the form of a bale, package, or bundle of individual glass fibers. In a first step, wet reinforcement fibers and resin fibers are opened. In particular, the bundle, or agglomeration, of wet reinforcement fibers are fed into a first opener which at least partially opens the bundle and filamentizes the wet reinforcement fibers. The first opener then feeds the at least partially opened bundle of wet reinforcement fibers to a condenser to remove water from the wet reinforcement fibers. The reinforcement fibers may then be transferred to a second opener which further filamentizes and separates the reinforcement fibers. The resin fibers are opened by passing the resin fibers through a third opener. Preferably, the resin fibers are polypropylene fibers. In alternate embodiments, the resin may be in the form of a flake, granule, or powder. Alternatively, a resin in the form of a flake, granule, or powder can be added in addition to the resin fibers. The first, second, and third openers can be bale openers such as are well-known in the art.

In a second step, the reinforcement fibers and resin fibers are blended by transferring the reinforcement fibers and resin fibers to a blower unit. In the blower unit, the reinforcement fibers and resin fibers are mixed together in an air stream. Preferably, approximately 20–60% of the fibers in the air stream are reinforcement fibers and 40–80% of the fibers in the air stream are resin fibers.

In a third step, the blended reinforcement fibers and resin fibers are transferred from the blower unit to a first sheet former where the fibers are formed into a sheet. In some embodiments of the invention, the reinforcement fibers and resin fibers are transferred from the blower unit to a filling box tower which volumetrically feeds the mixture of reinforcement fibers and resin fibers into the first sheet former.

The filling box tower may also include baffles to aid in mixing the reinforcement and resin fibers. Optionally, the sheet may be transferred to a second sheet former. The composite product formed from the sheet exiting the second sheet former may have a weight distribution of from 100–3000 g/m$^2$.

In an optional fourth step, the sheet exiting either the first sheet former or the second sheet former is subjected to a needling process in which needles are pushed through the fibers of the sheet to entangle the reinforcement fibers and resin fibers. The needling process may occur in a needle felting apparatus.

Either after forming the sheet or after the optional needling step, the sheet is passed through a thermal bonder to thermally bond the reinforcement fibers and resin fibers. The thermal bonder may include any known heating and bonding method known in the art. The temperature of the thermal bonder may range from approximately 100° C. to approximately 250° C., depending on the melting point of the particular resin fibers used. The composite product, e.g., a bonded mat, that exits the thermal bonder can be subsequently used as a reinforcement in a molding process to produce thermoplastic composite articles.

Another object of the present invention is to provide an apparatus for forming a composite product formed from wet reinforcement fibers. Preferably, wet use chopped strand glass fibers agglomerated in the form of a bale, package, or bundle of individual glass fibers are the wet reinforcement fibers. The apparatus includes a first opener to at least partially open a bundle of wet reinforcement fibers, a condenser to remove water from the wet reinforcement fibers, a blower unit to mix the reinforcement fibers and a resin, a first sheet former to form a sheet of the mixed reinforcement fibers and the resin, and a thermal bonder to bond the reinforcement fibers and the resin and form a composite product. In a preferred embodiment, the apparatus includes a second opener to separate the reinforcement fibers from the at least partially opened bundle of reinforcement fibers. Additionally, the apparatus may include a second sheet former to further form the sheet, a filling box tower to feed the mixture of reinforcement fibers and the resin to the first sheet former, and/or a needle felting apparatus to mechanically strengthen the sheet.

The present invention further includes a process for forming an insulation sheet and/or a low weight chopped strand glass mat. In this process, no resin fibers are used. Wet reinforcement fibers, e.g., wet use chopped strand glass fibers, are opened by passing the wet reinforcement fibers consecutively through a first opener, a condenser, and optionally, a third opener. The wet reinforcement fibers are then transferred to a sheet former by a blower unit. The sheet that exits the sheet former has little structural integrity. As a result, the sheet may be conveyed to a needle processing apparatus for mechanical strengthening. A binder resin is added prior to passing the sheet through a thermal bonder. The binder resin may be added by any suitable manner known to those of skill in the art. The resulting product, e.g., a fibrous mat, can be used as an insulation product or in combination with other types of foam and polymeric substrates.

The foregoing and other objects, features, and advantages of the invention will appear more fully hereinafter from a consideration of the detailed description that follows, in conjunction with the accompanying sheets of drawings. It is to be expressly understood, however, that the drawings are for illustrative purposes and are not to be construed as defining the limits of the invention.

DETAILED DESCRIPTION AND PREFERRED EMBODIMENTS OF THE INVENTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. It is to be noted that like numbers found throughout the figures denote like elements.

Figure 1:
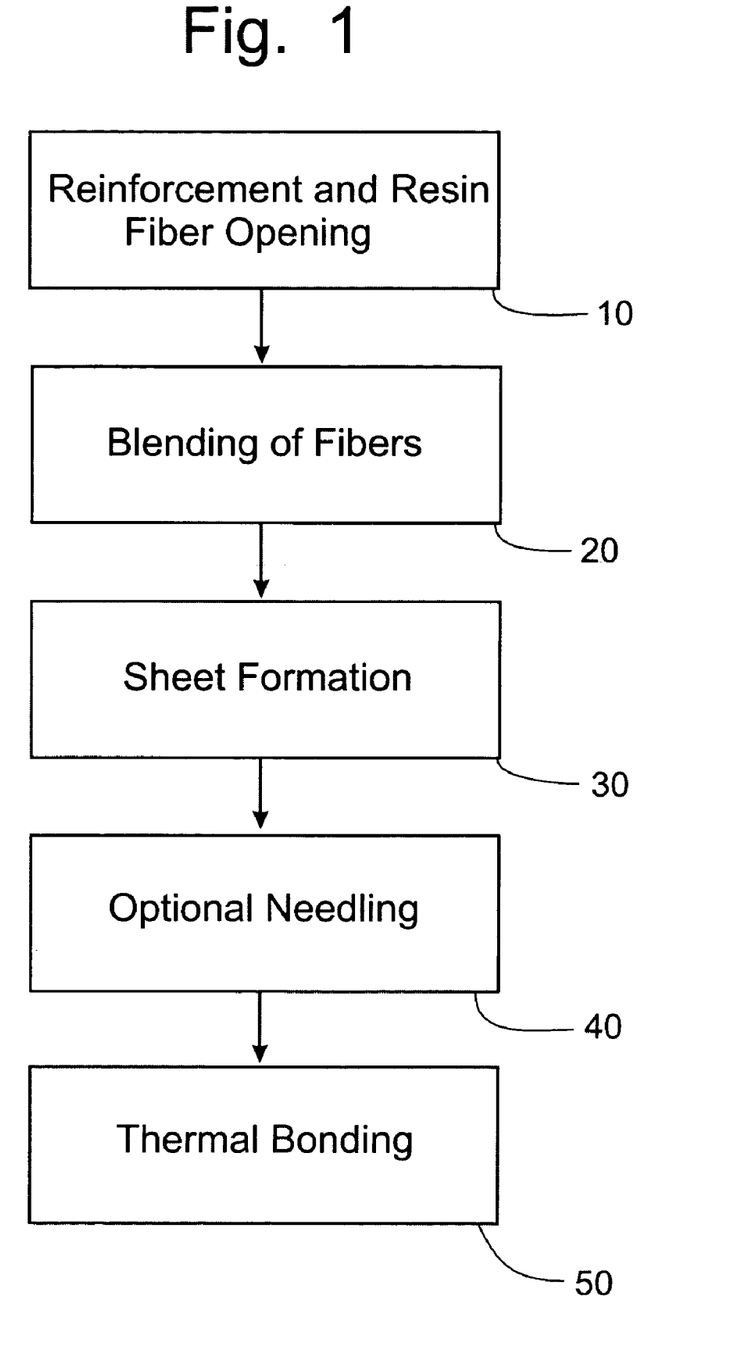
FIG. 1 is a flow diagram illustrating steps of an exemplary dry-laid process according to the present invention.

The present invention relates to a process for forming thermoplastic composites using wet reinforcement fibers, e.g., wet use chopped strand (WUCS) glass fibers, in a dry-laid process. As shown in FIG. 1, the process includes opening the reinforcement fibers and resin fibers (step 10), blending the reinforcement and resin fibers (step 20), forming the reinforcement and resin fibers into a sheet (step 30), optionally needling the sheet to give the sheet structural integrity (step 40), and thermal bonding the sheet (step 50). The term "sheet" as it is used herein also includes the terms "veils" or "mats." The terms "sheet", "mat", and "veil" may be used interchangeably.

In step 20 illustrated in FIG. 1, the reinforcement fibers and resin fibers are opened. Suitable reinforcement fibers include, but are not limited to, wet use chopped strand glass fibers. Any type of glass fibers, such as A-type glass fibers, C-type glass fibers, E-type glass fibers, and S-type glass fibers can be used as the wet chopped strand glass fibers. Wet reinforcement fibers, such as are used in the present invention, are typically agglomerated in the form of a bale, package, or a bundle of individual glass fibers. The term "bundle" as used herein is meant to indicate any type of agglomeration of wet reinforcement fibers, which would be easily identified and understood by those of ordinary skill in the art.

In a preferred embodiment, the reinforcement fibers are wet use chopped strand (WUCS) glass fibers. Wet use chopped strand glass fibers used as the reinforcement fibers can be formed by conventional processes known in the art. Preferably, the wet use chopped strand glass fibers have a moisture content of from 5–30%, and more preferably have a moisture content of from 5–15%. The chopped strand glass fibers preferably have a length of from 6–75 mm, and more preferably have a length of from 18–50 mm. In addition, the diameter of the glass fibers may range from 11–25 microns, but preferably the diameter of the glass fibers is in the range of from 12–16 microns.

The type of resin fiber used in the process of the present invention is not particularly limited, and includes synthetic fibers such as polypropylene fibers, polyester terepthalate (PET) fibers, polyvinyl acetate (PVA) fibers, ethylene vinyl acetate/vinyl chloride (EVA/VC) fibers, lower alkyl acrylate polymer fibers, acrylonitrile polymer fibers, partially hydrolyzed polyvinyl acetate fibers, polyvinyl alcohol fibers, polyvinyl pyrrolidone fibers, styrene acrylate fibers, nylon fibers, cellulosic fibers (e.g., cotton), natural fibers (e.g., sisal, jute, kenaf, and hemp), or any combination thereof. In a preferred embodiment, the resin fibers are polypropylene fibers. Preferably, the resin fibers are 6–75 mm in length, and are more preferably from 18–50 mm in length. Additionally, the resin fibers may have a weight per length of from 3–30 denier, and preferably have a weight per length of from 3–7 denier. The resin fibers may be functionalized with acidic groups, for example, by carboxylating with an acid such as a maleated acid or an acrylic acid, or the resin fibers may be functionalized by adding an anhydride group or vinyl acetate. In alternative embodiments, the resin may be in the form of a flake, granule, or a powder rather than in the form of a fiber. Alternatively, a resin in the form of a flake, granule, and/or a powder may be added in addition to the resin fibers.

Figure 2:
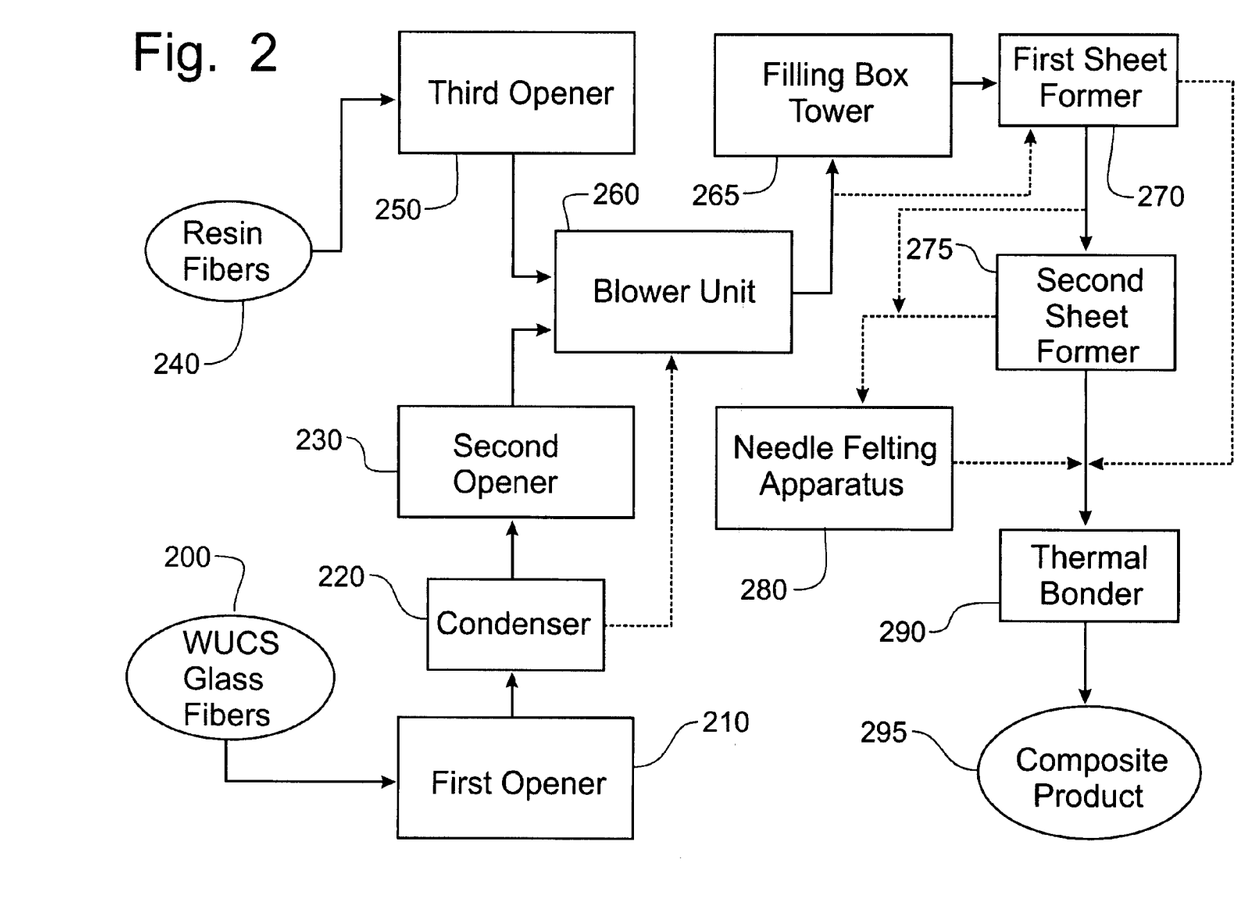
FIG. 2 is a schematic illustration of an air-laid process using wet use chopped strand glass fibers according to at least one exemplary embodiment of the present invention.

Turning now to FIG. 2, the opening of the wet reinforcement fibers and the resin fibers can best be seen. Although FIG. 2 depicts the opening of wet use chopped strand glass fibers (WUCS), a preferred wet reinforcement fiber, any suitable wet reinforcement fiber identified by one of skill in the art could be utilized in the illustrated process. To open the wet use chopped strand glass fibers, the WUCS glass fibers 200, typically in the form of a bale, package, or bundle of individual glass fibers, are fed into a first opener 210, which at least partially opens and filimentizes (e.g., individualizes) the WUCS glass fibers 200. The first opener 210 may then dose or feed the WUCS glass fibers 200 to a condenser 220, where water is removed from the WUCS glass fibers 200. In exemplary embodiments, greater than 70% of the free water, e.g., water that is external to the glass fibers, is removed. Preferably, however, substantially all of the water is removed by the condenser 220. It should be noted that the phrase "substantially all of the water" as it is used herein is meant to denote that all or nearly all of the free water is removed.

Once the WUCS glass fibers 200 have passed through the condenser 220, the WUCS glass fibers 200 may then be passed through a second opener 230. The second opener 230 further filimentizes and separates the WUCS glass fibers 200.

To open the resin fibers 240, the resin fibers 240 are passed through a third opener 250, where the resin fibers 240 are opened and filamentized. In alternate embodiments where the resin is in the form of a flake, granule, or powder, the third opener 250 may be replaced with an apparatus suitable for distributing the resin to the blower unit 260 for mixing with the WUCS glass fibers 200. A suitable apparatus would be easily identified by those of skill in the art. In embodiments where a resin in the form of a flake, granule, or powder is used in addition to the resin fibers 240, the apparatus distributing the flakes, granules, or powder does not replace the third bale opener 250. Alternatively, a resin powder, flake or granule may be added prior thermal bonding in the thermal bonder 290 in addition to or in place of the resin fibers 240.

Other types of fibers such as chopped roving, dry use chopped strand glass, A-, C- E- or S-type glass fibers, natural fibers (e.g., jute, hemp, and kenaf), aramid fibers, metal fibers, ceramic fibers, mineral fibers, carbon fibers, graphite fibers, polymer fibers, or combinations thereof can be opened and filamentized by additional openers (not shown) depending on the desired composition of the final composite. These fibers can be added to the air stream in the blower unit 260 and mixed with the WUCS glass fibers 200 as described below with respect to the resin fibers 240. When such fibers are added, preferably from 10–30% of the fibers in the air stream consist of these additional fibers.

The first, second, and third openers (210, 230, 250) are preferably bale openers, but may be any type of opener suitable for opening the bundle of wet reinforcement fibers. The design of the openers depends on the type and physical characteristics of the fiber being opened. Suitable openers for use in the present invention include any conventional standard type bale openers with or without a weighing device. The bale openers may be equipped with various fine openers and may optionally contain one or more licker-in drums or saw-tooth drums. The bale openers may be equipped with feeding rollers or a combination of a feeding roller and a nose bar. The condenser 220 may be any known drying or water removal device known in the art, such as, but not limited to, an air dryer, an oven, rollers, a suction pump, a heated drum dryer, an infrared heating source, a hot air blower, and a microwave emitting source.

After the WUCS glass fibers 200 and the resin fibers 240 have been opened and filamentized, they are transferred to a blower unit 260 where the WUCS glass fibers 200 and resin fibers 240 are blended together in an air stream (step 20 of FIG. 1). Preferably, approximately 20–60% of the fibers in the air stream are reinforcement fibers, e.g. WUCS glass fibers, and 40–80% of the fibers in the air stream are resin fibers. Preferably, the reinforcement fibers are present in the air stream in an amount of from 40–60%.

The blended WUCS glass fibers 200 and resin fibers 240 are then transferred by the air stream from the blower unit 260 to a first sheet former 270 where the fibers are formed into a sheet (step 30 of FIG. 1). In one exemplary embodiment of the invention, the opened WUCS glass fibers 200 and resin fibers 240 are transferred from the blower unit 260 to a filling box tower 265 to volumetrically feed the WUCS glass fibers 200 and resin fibers 240 into the first sheet former 265, such as by an electronic weighing apparatus. The filling box tower 265 may be located in the first sheet former 270 or may be positioned external to the first sheet former 270. Additionally, the filling box tower 265 may include baffles to further blend and mix the WUCS glass fibers 200 and resin fibers 240 prior to entering the first sheet former 270.

In an alternative embodiment (not shown), the blended WUCS glass fibers 200 and resin fibers 240 are blown onto a drum or series of drums covered with fine wires or teeth to comb the fibers into parallel arrays prior to entering the first sheet former 270, as in a carding process.

In a preferred embodiment, the sheet formed by the first sheet former 270 is transferred to a second sheet former 275. The second sheet former 275 permits the sheet to have a substantially uniform distribution of the WUCS glass fibers 200 and resin fibers 240. In addition, the second sheet former 275 permits the final composite product 295 to have high structural integrity. In particular, the composite product 295 formed may have a weight distribution of from 100–3000 $g/m^2$, with a preferred range of from 600–2000 $g/m^2$.

The first and second sheet formers 270, 275 may include at least one licker-in drum having two to four sieve drums. Depending on the reinforcement fibers used, the first and second sheet formers 270, 275 may be equipped with one or more of the following: a condenser, a distribution conveyor, a powder strewer, and a chip strewer. A sheet former having a condenser and a distribution conveyor is typically used to achieve a higher fiber feed into the filling box tower and an increased volume of air through the filling box tower. In order to achieve an improved cross-distribution of the opened fibers, the distributor conveyor can run transversally to the direction of the sheet. As a result, the opened fibers are transferred from the condenser and into the filling box tower with little or no pressure.

The sheet exiting the first sheet former 270 and the second sheet former 275 has little structural integrity. As a result, the sheet may optionally be subjected to a needling process in which needles are pushed through the fibers of the sheet to entangle the WUCS glass fibers 200 and resin fibers 240 (step 40 of FIG. 1). The needling process may occur in a needle felting apparatus 280. The needle felting apparatus 280 may include a web feeding mechanism, a needle beam with a needleboard, barbed felting needles ranging in number from about 500 per meter to about 7,500 per meter of machine width, a stripper plate, a bed plate, and a take-up mechanism. Mechanical interlocking of the WUCS glass fibers 200 and resin fibers 240 is achieved by passing the barbed felting needles repeatedly into and out of the sheet. An optimal needle selection for use with the particular reinforcement fiber and resin fiber chosen for use in the inventive process would be easily identified by one of skill in the art.

Either after the sheet forming step 30 or the optional needling step 40, the sheet is passed through a thermal bonder 290 to thermally bond the WUCS glass fibers 200 and resin fibers 240. In thermal bonding, the thermoplastic properties of the resin fibers are used to form bonds with the reinforcement fiber (e.g., WUCS glass fibers 200) upon heating. The thermal bonder 290 may include any known heating and bonding method known in the art, such as oven bonding, oven bonding using forced air, infrared heating, hot calendaring, belt calendaring, ultrasonic bonding, microwave heating, and heated drums. Optionally, two or more of these bonding methods may be used in combination to bond the WUCS glass fibers 200 and resin fibers 240 in the sheet. The temperature of the thermal bonder 290 may range from approximately 100° C. to approximately 250° C., depending on the melting point of the particular resin fiber(s) used.

Although the thermoplastic properties of the resin fibers can be used to bond reinforcement fibers (e.g., WUCS glass fibers 200) and resin fibers (e.g., resin fibers 240), single component binding fibers, bicomponent binding fibers, and/or powdered polymers may be added to the sheet to further bond the WUCS glass fibers 200 and resin fibers 240. Typical examples of such fibers include polyester fibers, polyethylene fibers, and polypropylene-polyethylene fibers. Such bonding agent(s) may be added during the initial blending of the WUCS glass fibers 200 and the resin fibers 240 in the blower unit 260. If the bonding agent is in powdered or flaked form, it can be added to the sheet prior to the sheet entering the thermal bonder 290. Suitable methods for adding the bonding agent to the sheet include spraying the bonding agent onto the sheet and impregnating or coating the sheet with the bonding agent. When the sheet containing the bonding agents is passed through the thermal bonder 290, the bonding agent further bonds the WUCS glass fibers 200 and the resin fibers 240.

Another method that may be used to increase the strength of the sheet after it exits either the first sheet former 270 or the second sheet former 275 is chemical bonding. In chemical bonding, a bonding agent is applied to a sheet or web to bond the reinforcement fibers and resin fibers. Liquid based bonding agents, powdered adhesives, foams, and, in some instances, organic solvents can be used as the chemical bonding agent. Suitable examples of chemical bonding agents include, but are not limited to, acrylate polymers and copolymers, styrene-butadiene copolymers, vinyl acetate ethylene copolymers, and combinations thereof. For example, polyvinyl acetate (PVA), ethylene vinyl acetate/vinyl chloride (EVA/VC), lower alkyl acrylate polymer, styrene-butadiene rubber, acrylonitrile polymer, polyurethane, epoxy resins, polyvinyl chloride, polyvinylidene chloride, and copolymers of vinylidene chloride with other monomers, partially hydrolyzed polyvinyl acetate, polyvinyl alcohol, polyvinyl pyrrolidone, polyester resins, and styrene acrylate may be used as a bonding agent. The chemical bonding agent can be applied uniformly by impregnating, coating, or spraying the sheet. Although the temperature requirements for initiating chemical bonding is generally lower than the temperature requirements for thermally bonding the reinforcement fibers and the resin fibers, the chemical bonding process is not as desirable as thermal bonding because it requires the removal of excess bonding agents and further drying of the sheet.

The composite product 295, e.g., a bonded mat, that exits the thermal bonder 290 can be subsequently used as a reinforcement in a molding process to produce composite articles. For example, the composite product 295 can be used in molding semi-structural and acoustical parts for automobiles, in furniture industries such as in making seat backs, in making cubicle partitions, and can also be used in other industrial applications such as in parts for industrial and construction vehicles. The composite product 295 formed may expand (e.g., loft) on reheating to provide increased stiffness and acoustic properties to the composite product 295. In addition, the composite product 295 can be further processed by conventional nip rolling (not shown) or laminating (not shown) to apply a scrim and a film. Subsequent shear slitting (not shown) provides a final product that can then be molded into a headliner or other interior parts for an automobile, such as trim panels, parcel shelves, sunshades, instrument panel structures, and door inners.

The process of manufacturing the composite product 295 that exits the thermal bonder 290 may be conducted either in-line, i.e., in a continuous manner, or in individual steps. Preferably, the process is conducted in-line. Moreover, any additional process steps such as adding specialty films, scrims, and/or fabrics are considered within the scope of the invention.

Figure 3:
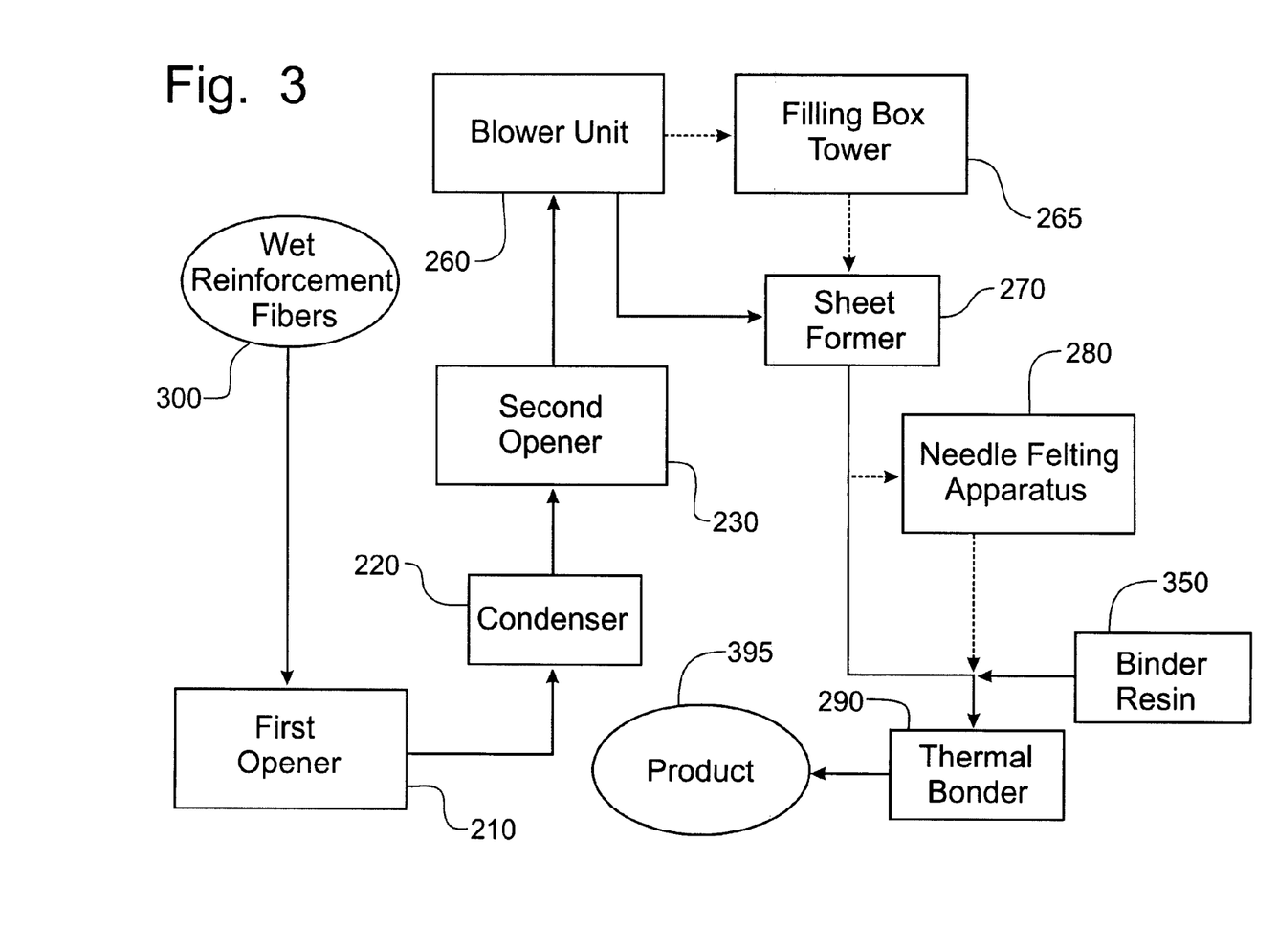
FIG. 3 is a schematic illustration of an alternate embodiment of the present invention in which no resin fibers are utilized.

Turning now to FIG. 3, an alternate embodiment of the process of the present invention can be seen. In this alternate embodiment, no resin fibers are utilized. In particular, wet reinforcement fibers 300, e.g., wet use chopped strand glass fibers, are opened by passing the wet reinforcement fibers 300, typically in the form of a bale, package, or a bundle of individual glass fibers, consecutively through the first opener 210, the condenser 220, and optionally, the second opener (not shown in FIG. 3). The wet reinforcement fibers 300 are then conveyed by the blower unit 260 to the first sheet former 270. Alternatively, the wet reinforcement fibers 300 may be conveyed to the filling box tower 265 prior to entering the first sheet former 270. The filling box tower 265 volumetrically feeds the reinforcement fibers 300 to the first sheet former 270. As in the preferred embodiment described above, the sheet may optionally be conveyed to the second sheet former (not shown in FIG. 3) and/or the needle felting apparatus 280 for mechanical strengthening. A binder resin 350 may be added prior to passing the sheet through the thermal bonder 290. The binder resin 350 may be added by any suitable manner, such as, for example, a flood and extract method or by spraying the binder resin 350 on the sheet. Any binder resin capable of binding the wet reinforcement fibers 300 can be used. Suitable examples include single and bicomponent fibers or powders. Further, the amount of binder can be varied depending of the type of mat desired. The sheet is then passed through the thermal bonder 290 to cure the binder resin 350 and provide structural integrity to the reinforcement fibers 300. Alternatively, a catalyst such as ammonium chloride, p-toluene, sulfonic acid, aluminum sulfate, ammonium phosphate, or zinc nitrate may be used to improve the rate of curing and the quality of the cured binder resin. The resulting product 395, e.g., a fibrous mat, may be used as an insulation product or in combination with other types of foam and polymeric substrates.

The process of the present invention provides many advantages over conventional dry-laid processes and wet-laid processes. In particular, the inventive process provides a substantially uniform distribution of reinforcement fibers and resin fibers in both the mat and composite product formed. The phrase "substantially uniform distribution of reinforcement fibers and resin fibers" is meant to indicate a uniform distribution or a nearly uniform distribution of the reinforcement fibers and the resin fibers. In addition, the use of wet use chopped strand glass fibers in the inventive process allows the process to have a lower cost, especially when compared to conventional dry-laid processes that use dry use chopped strand glass fibers. Additionally, the inventive method can be tailored to achieve numerous desired composite properties by adding additional types of reinforcement fibers and/or resin fibers. Further, the sizing chemistry of the reinforcement fibers may be easily adapted to match the properties of individual types of resin fibers. As a result, a large variety of mats and composite products can be formed by the process according to the present invention.

In addition, the composite product formed may expand (e.g., loft) on reheating to provide increased stiffness and acoustic properties compared to products produced by conventional wet-laid processes. For example, an 800 GSM product containing 55% WUCS glass formed by a conventional wet-laid process can loft to approximately 5 mm in height, whereas a composite containing 55% WUCS glass formed by the inventive process can loft to approximately 9 mm. This lofting enables composites formed using the inventive process to have greater sound absorption capability.

Having generally described this invention, a further understanding can be obtained by reference to certain specific examples illustrated below which are provided for purposes of illustration only and are not intended to be all inclusive or limiting unless otherwise specified.

EXAMPLE

A composite product was produced according to an exemplary embodiment of the present invention. In particular, wet use chopped strand glass fibers were dried and individualized by sequentially passing the WUCS fibers through a first bale opener, a condenser, and a second bale opener. Polypropylene fibers were opened by a third bale opener, and the opened polypropylene fibers were added to the WUCS glass fibers and transferred to a sheet former. Next, the sheet was passed through a thermal bonding oven which had a temperature of from 140° C. to 200° C. to form a composite product. The formed composite contained approximately 55% WUCS glass fibers and 45% polypropylene fibers. In addition, a composite product was formed by a conventional wet laid process using wet use chopped strand glass fibers and polypropylene fibers. As in the composite formed by the inventive process, the composite product formed by the conventional method contained approximately 55% WUCS glass fibers and 45% polypropylene fibers.

Figure 4:
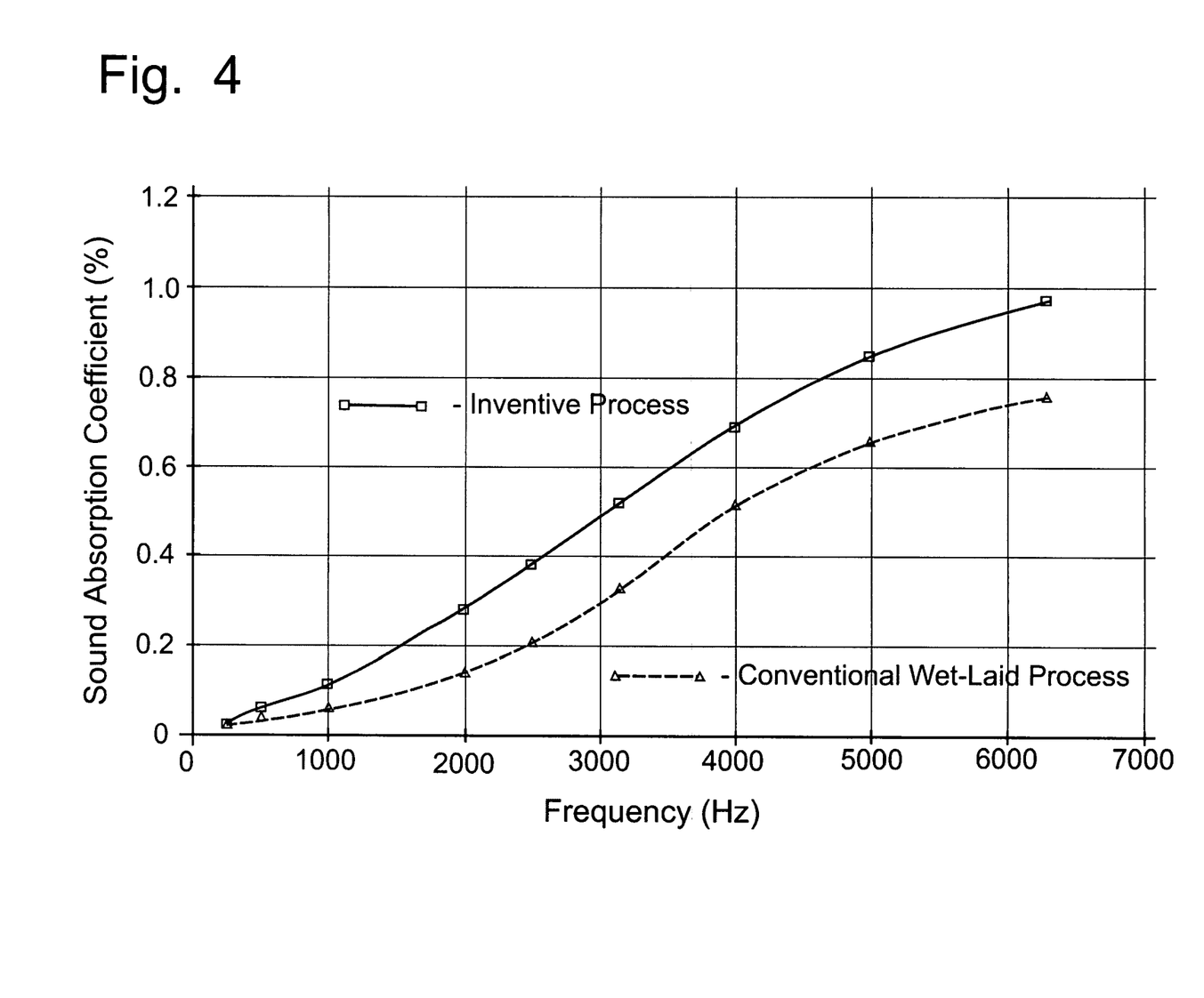
FIG. 4 is a graphical illustration of acoustic properties of a composite formed by a conventional dry-laid process and a composite formed by an exemplary embodiment of the present invention.

A comparison of the acoustical properties of the inventive composite product and the composite product formed by the convention wet-laid process were conducted in accordance to ASTM E1050. The results are shown in Table 1. A graphical illustration of Table 1 is shown in FIG. 4. As can be seen in FIG. 4, the composite product produced by the inventive process, which is depicted by the solid line, exhibited superior sound absorption compared to the composite product formed by the conventional wet-laid process, which is depicted by the dashed line.

TABLE 1

| FREQUENCY (Hz) | INVENTIVE PROCESS | CONVENTIONAL WET-LAID PROCESS |
| --- | --- | --- |
| 250 | 0.02 | 0.02 |
| 500 | 0.06 | 0.04 |
| 1000 | 0.11 | 0.07 |
| 2000 | 0.28 | 0.18 |
| 2500 | 0.38 | 0.28 |
| 3150 | 0.52 | 0.43 |
| 4000 | 0.69 | 0.61 |
| 5000 | 0.85 | 0.70 |
| 6300 | 0.97 | 0.71 |

Table 2 shown below illustrates a comparison of various properties of a composite product formed by the inventive process, a composite formed by a conventional wet-laid process, and a composite formed by a conventional dry-laid process. Acoustical measurements were made in accordance with ASTM E1050 and mechanical strength measurements were made in accordance with SAE J949. As shown in Table 2, the composite formed by the inventive process showed superior weight consistency, reinforcement content consistency, and mechanical properties compared to the composite formed by the conventional dry-laid process. In addition, the composite formed by the inventive process demonstrated superior acoustical properties and thickness after heating (e.g., lofting) compared to the composite formed by the conventional wet-laid process. Further, it can be seen in Table 2 that the cost of forming the composite using the inventive process was lower than the cost of forming the composite using the conventional dry-laid process.

TABLE 2

| PROPERTIES | INVENTIVE PROCESS | CONVENTIONAL WET-LAID PROCESS | CONVENTIONAL DRY-LAID PROCESS |
| --- | --- | --- | --- |
| Weight Consistency | ±3–5% | ±3–5% | ±5–10% |
| Reinforcement Content Consistency Properties | ±2% | ±2% | ±3–5% |
| Mechanical | 100% | 100% | 80–90% |
| Acoustical | 100% | 70–90% | 100% |
| Thickness after Heating | 100% | 50–60% | 100% |
| Cost | 100% | 100% | 110–120% |

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. A process for forming a composite product comprising:
   at least partially opening a bundle of wet reinforcement fibers;
   removing water from the wet reinforcement fibers to form dehydrated reinforcement fibers;
   mixing the dehydrated reinforcement fibers with a resin to form a mixture of the dehydrated reinforcement fibers and the resin;
   forming the mixture into a sheet; and
   thermal bonding the dehydrated reinforcement fibers and the resin to form a composite product.

2. The process according to claim 1, further comprising:
   separating the dehydrated reinforcement fibers from the bundle.

3. The process according to claim 1, wherein the wet reinforcement fibers are wet use chopped strand glass fibers.

4. The process according to claim 1, further comprising:
   adding a member selected from the group consisting of chopped roving, dry use chopped strand glass fibers, E-type glass fibers, A-type glass fibers, C-type glass fibers, S-type glass fibers, natural fibers, carbon fibers, aramid fibers, metal fibers ceramic fibers, mineral fibers, graphite fibers and any combination thereof to the mixture.

5. The process according to claim 1, wherein the step of forming the sheet comprises:
   passing the mixture consecutively through a first sheet former and a second sheet former.

6. The process according to claim 5, wherein the sheet has a substantially uniform distribution of the dehydrated reinforcement fibers and the resin.

7. The process according to claim 1, further comprising:
   transferring the mixture to a filling box tower prior to forming the sheet.

8. The process according to claim 1, further comprising:
   passing the sheet through a needle felting apparatus prior to thermal bonding.

9. A process for forming a fibrous mat comprising:
   at least partially opening a bundle of wet reinforcement fibers;
   removing water from the wet reinforcement fibers to form dehydrated reinforcement fibers;
   forming a sheet containing the dehydrated reinforcement fibers;
   adding a binder resin to the sheet; and
   passing the sheet through a thermal bonder to cure the binder resin to form a fibrous mat.

10. The process according to claim 9, further comprising:
    separating the dehydrated reinforcement fibers from the bundle.

11. The process according to claim 9, wherein the wet reinforcement fibers are wet use chopped strand glass fibers.

12. The process according to claim 9, further comprising:
    passing the sheet through a needle felting apparatus prior to curing the binder resin.

13. The process according to claim 9, wherein the step of forming the sheet comprises:
    passing the dehydrated reinforcement fibers consecutively through a first sheet former and a second sheet former.

14. The process according to claim 9, further comprising:
    transferring the dehydrated reinforcement fibers to a filling box tower prior to forming the sheet.

* * * * *